US012403345B2

(12) United States Patent
Kammer

(10) Patent No.: US 12,403,345 B2
(45) Date of Patent: Sep. 2, 2025

(54) CLOSURE FOR NOZZLES WITH HEAT ACTIVATION AND INTELLIGENT CONTROLLER FOR CLOSURES

(71) Applicant: Peter Kammer, Feldbrunnen (CH)

(72) Inventor: Peter Kammer, Feldbrunnen (CH)

( * ) Notice: Subject to any disclaimer, the term of this patent is extended or adjusted under 35 U.S.C. 154(b) by 0 days.

(21) Appl. No.: 18/581,621

(22) Filed: Feb. 20, 2024

(65) Prior Publication Data

US 2024/0189640 A1 Jun. 13, 2024

Related U.S. Application Data

(62) Division of application No. 17/266,946, filed as application No. PCT/EP2019/071300 on Aug. 8, 2019, now abandoned.

(30) Foreign Application Priority Data

Aug. 9, 2018 (EP) .................................... 18188165

(51) Int. Cl.
*A62C 37/14* (2006.01)
*A62C 37/12* (2006.01)

(52) U.S. Cl.
CPC .............. *A62C 37/14* (2013.01); *A62C 37/12* (2013.01)

(58) Field of Classification Search
CPC ......... A62C 37/04; A62C 37/08; A62C 37/10; A62C 37/11; A62C 37/12; A62C 37/14; A62C 37/36; A62C 37/38; A62C 37/40; A62C 37/42; A62C 37/46; A62C 37/48
See application file for complete search history.

(56) References Cited

U.S. PATENT DOCUMENTS

| | | | | | | |
|---|---|---|---|---|---|---|
| 2,389,332 | A | * | 11/1945 | Tyden | A62C 37/09 | 169/37 |
| 3,783,947 | A | * | 1/1974 | Dix | A62C 37/12 | 169/42 |
| 3,818,994 | A | * | 6/1974 | Livingston | A62C 37/10 | 169/37 |
| 3,823,779 | A | * | 7/1974 | Stamm | A62C 37/10 | 169/42 |
| 3,828,855 | A | * | 8/1974 | Woodward | A62C 37/10 | 169/42 |
| 3,831,682 | A | * | 8/1974 | Calcaro | A62C 37/10 | 169/42 |
| 4,105,076 | A | * | 8/1978 | Simons | A62C 37/09 | 169/42 |
| 4,664,198 | A | * | 5/1987 | Johnson | A62C 37/12 | 169/38 |

(Continued)

*Primary Examiner* — Darren W Gorman
(74) *Attorney, Agent, or Firm* — Donald J. Ersler

(57) ABSTRACT

Closure for nozzles with heat activation for use in fire-fighting, comprising a nozzle body (1) and an outlet channel (11) which is kept tightly closed by a cover (5). The cover (5) is detachably connected to the nozzle body (1) and detaches in case of fire. At least one of the fastenings between the cover (5) and the nozzle body (1) is a releasable arrangement (6) and at least one other is a connection (7). The heat-sensitive element is integrated in the releasable arrangement (6) or acts thereon so that the releasable arrangement (6) is detached when the heat-sensitive element is released. The forces on the cover (5) are distributed between the detachable assembly (6) and the joint (7) so that the detachable assembly (6) carries only a fraction of these forces.

9 Claims, 9 Drawing Sheets

(56) References Cited

U.S. PATENT DOCUMENTS

| | | | | | |
|---|---|---|---|---|---|
| 4,976,320 | A * | 12/1990 | Polan | A62C 37/14 | 169/37 |
| 5,083,616 | A * | 1/1992 | Polan | A62C 37/14 | 169/37 |
| 5,299,645 | A * | 4/1994 | Hoening | A62C 37/14 | 137/79 |
| 6,112,820 | A * | 9/2000 | Job | A62C 37/14 | 169/41 |
| 6,896,066 | B2 * | 5/2005 | Gil | A62C 37/40 | 169/61 |
| 8,607,887 | B2 * | 12/2013 | Kammer | A62C 37/12 | 169/41 |
| 2005/0252665 | A1 * | 11/2005 | Kammer | A62C 37/12 | 169/42 |
| 2011/0155265 | A1 * | 6/2011 | Kikuchi | A62C 35/60 | 137/468 |
| 2014/0158383 | A1 * | 6/2014 | Hansen | A62C 35/68 | 169/46 |

* cited by examiner

CLOSURE FOR NOZZLES WITH HEAT ACTIVATION AND INTELLIGENT CONTROLLER FOR CLOSURES

CROSS-REFERENCES TO RELATED APPLICATIONS

This is a divisional patent application which claims priority from non-provisional patent application Ser. No. 17/266,946, filed on Feb. 8, 2021.

FIELD OF THE INVENTION

The present invention relates to a closure for sprinklers and nozzles with heat activation for use in the field of fire-prevention and fire-fighting, and an intelligent controller for such closures.

BACKGROUND OF THE INVENTION

Most fire protection systems, for example sprinkler systems in buildings, are automatically activated by heat-sensitive elements in the event of a fire. This ensures high reliability, as they react directly to the heat generated by the fire and are independent of any external alarm signal or human action. Common heat sensitive elements are, for example, fusible elements (see e.g. EP 1515780) or frangible glass bulbs (see e.g. U.S. Pat. No. 9,573,007). A major disadvantage of these devices is that they are only activated after the room air has been heated by the fire and the heat-sensitive element is subsequently heated by the heated room air. In the meantime, decisive minutes pass during which the fire can develop and spread. In addition, dangerous smoke formation can already take place in the start-up phase, before the fire really starts, which should be fought as quickly as possible with a water mist for example. There are methods that practically enable immediate fire detection, e.g. by means of smoke sensors. In EP 2038018, a closure for sprinklers and nozzles with heat activation is provided, whereby a smoke sensor or thermostat enables rapid fire detection. The nozzle is closed with a cover plate firmly connected to the nozzle body by means of a fusible element. In the event of fire, the room temperature and the temperature of the fusible elements increase until the fusible elements melt, the cover plate falls away and the nozzle is opened. Parallel to this, the fusible elements are arranged on heating elements which are controlled by the smoke sensor or the thermostat. If the sensors report a fire, the fusible elements can be actively fused with the heating elements and the nozzle can thus be opened long before the passive fusion of the fusible elements due to the heated room air. Such systems thus combine two parallel activation methods: early, active activation by controlled heating after fire detection by sensors and, if this fails, passive activation by the heat generated by the fire. Another advantage of the device according to EP 2038018 is the compact design of the closure which hardly protrudes from the nozzle body and is therefore quite easy to integrate in a ceiling or wall. In contrast, conventional sprinklers with frangible glass bulbs (see e.g. U.S. Pat. No. 9,573,007) always have a length of several centimetres.

In practice, however, it has been shown that the melting temperature of the fusible elements can change over the years. Responsible for this is the gradual deformation and change in the material structure of the fusible element due to creep caused by the constant tension it is under. For example, the fusible links in EP 2038018 carry both the force of the structural part under tension and the compressive force of the extinguishing agent under pressure. During creep, the temperature and its fluctuations in the monitored room also play an important role: for example, the deformation of the fusible elements is significantly accelerated at room temperatures of over 30° C. This can cause permanent deformation of the fusible elements over the years and change the melting temperature of the fusible element. After several years, the melting point can be higher than originally intended, so that the fusible element responds later, but it can also be lower, so that the fusible element responds earlier. Both cause damage that was originally intended to be avoided with the use of such devices. In contrast, breakable glass bulbs are reliable and stable heat-sensitive elements and besides, they are available on the market in various standard versions with different triggering temperatures.

BRIEF SUMMARY OF THE INVENTION

The object of the present invention is to improve a closure for sprinklers and nozzles with heat activation according to EP 2038018 in such a way that the compact structure and the two parallel activation methods (active by controlled activation and passive by the heat generated by the fire) are retained, but the activation mechanism is improved in such a way that the reliability, stability and invariability of the activation temperature of the heat-sensitive element is guaranteed.

This object is achieved by a closure for sprinklers and nozzles with heat activation having the features of claim 1. Further features and embodiments are apparent from the dependent claims and their advantages are explained in the following description.

The figures show possible embodiments which are explained in the following description.

DETAILED DESCRIPTION OF THE INVENTION

Figure 1A:
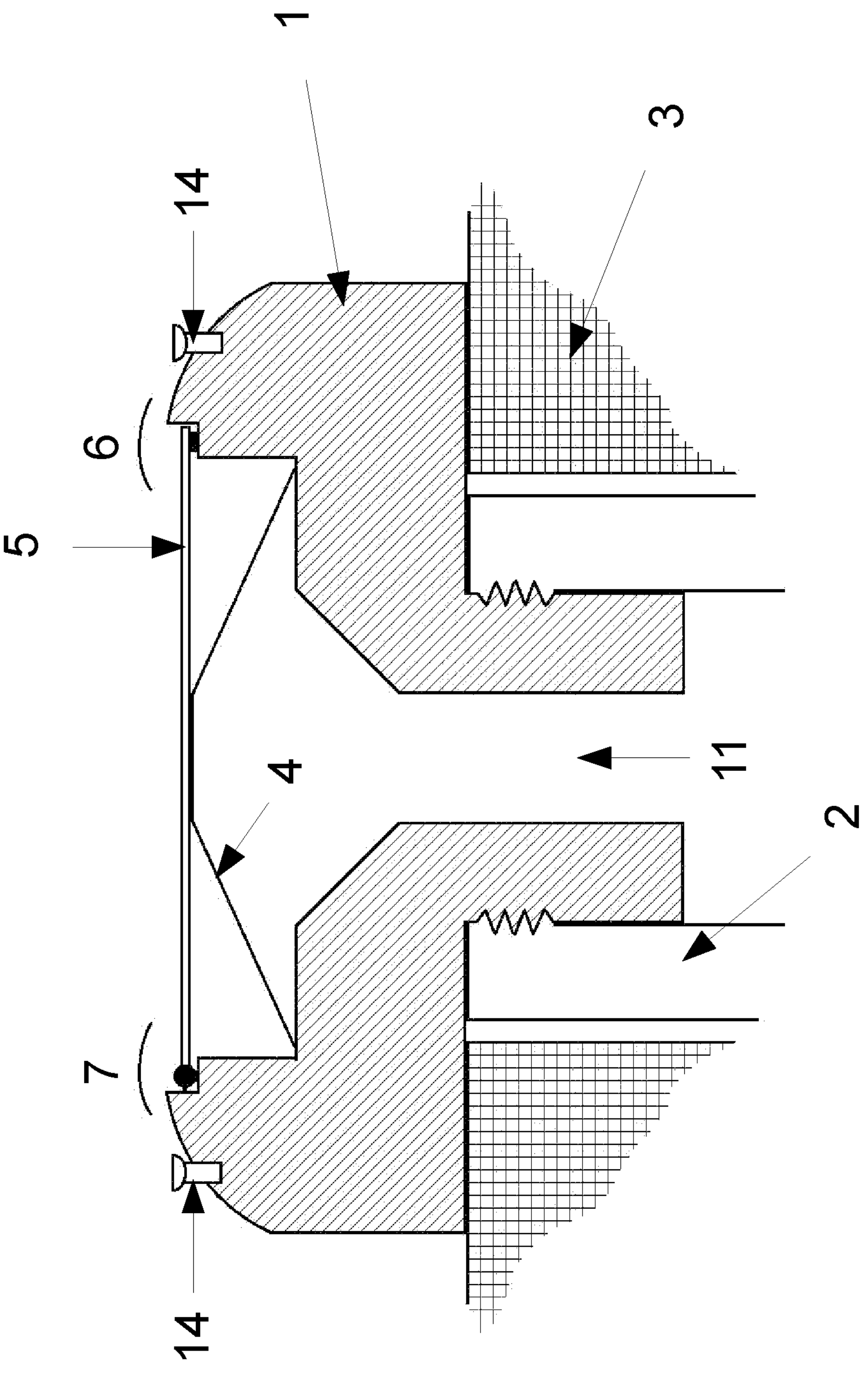
FIG. 1*a* Closure for sprinklers and nozzles with flared outlet opening.
Figure 1B:
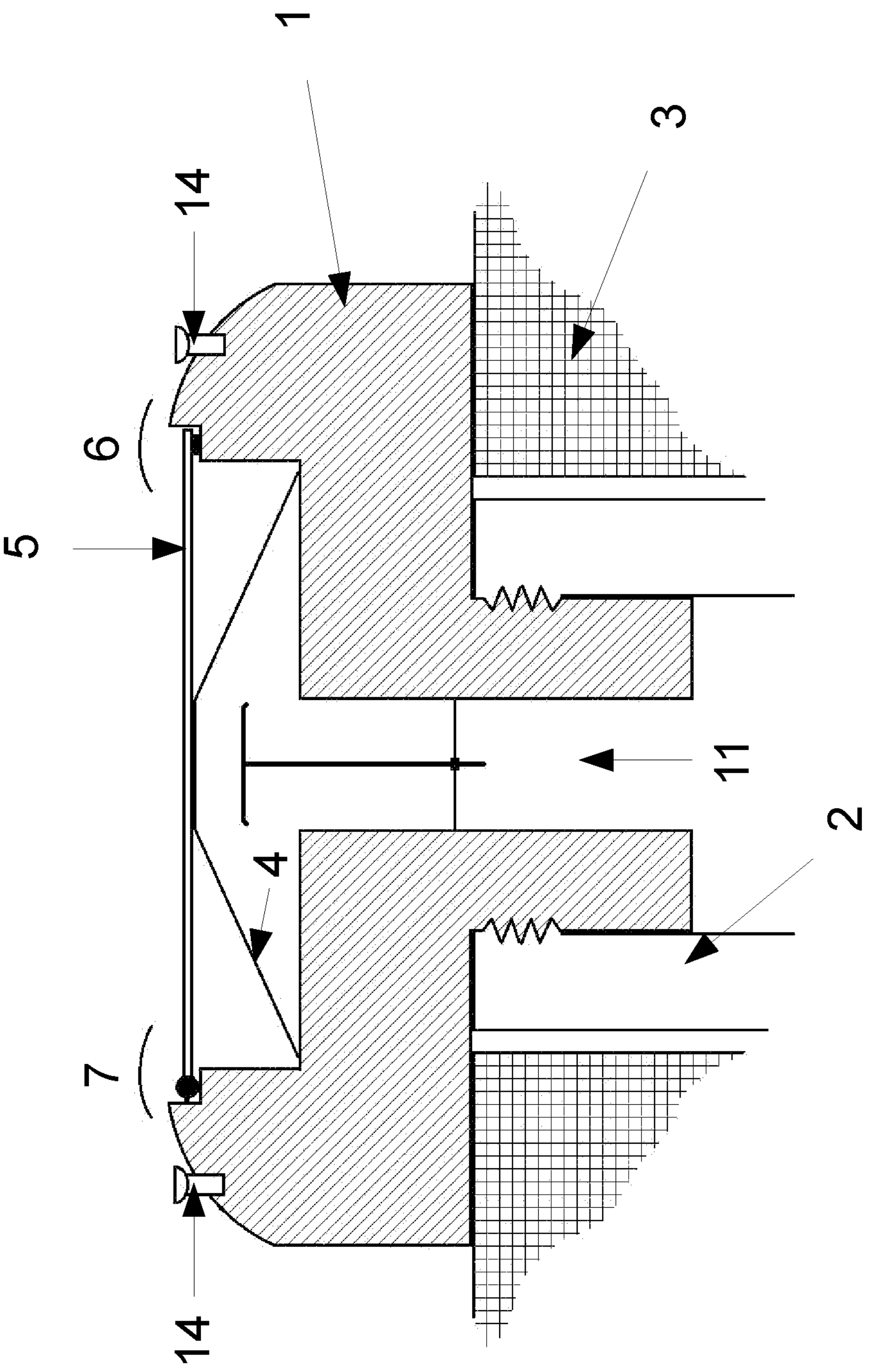
FIG. 1*b* Closure for sprinklers and nozzles with deflector plate.
Figure 1C:
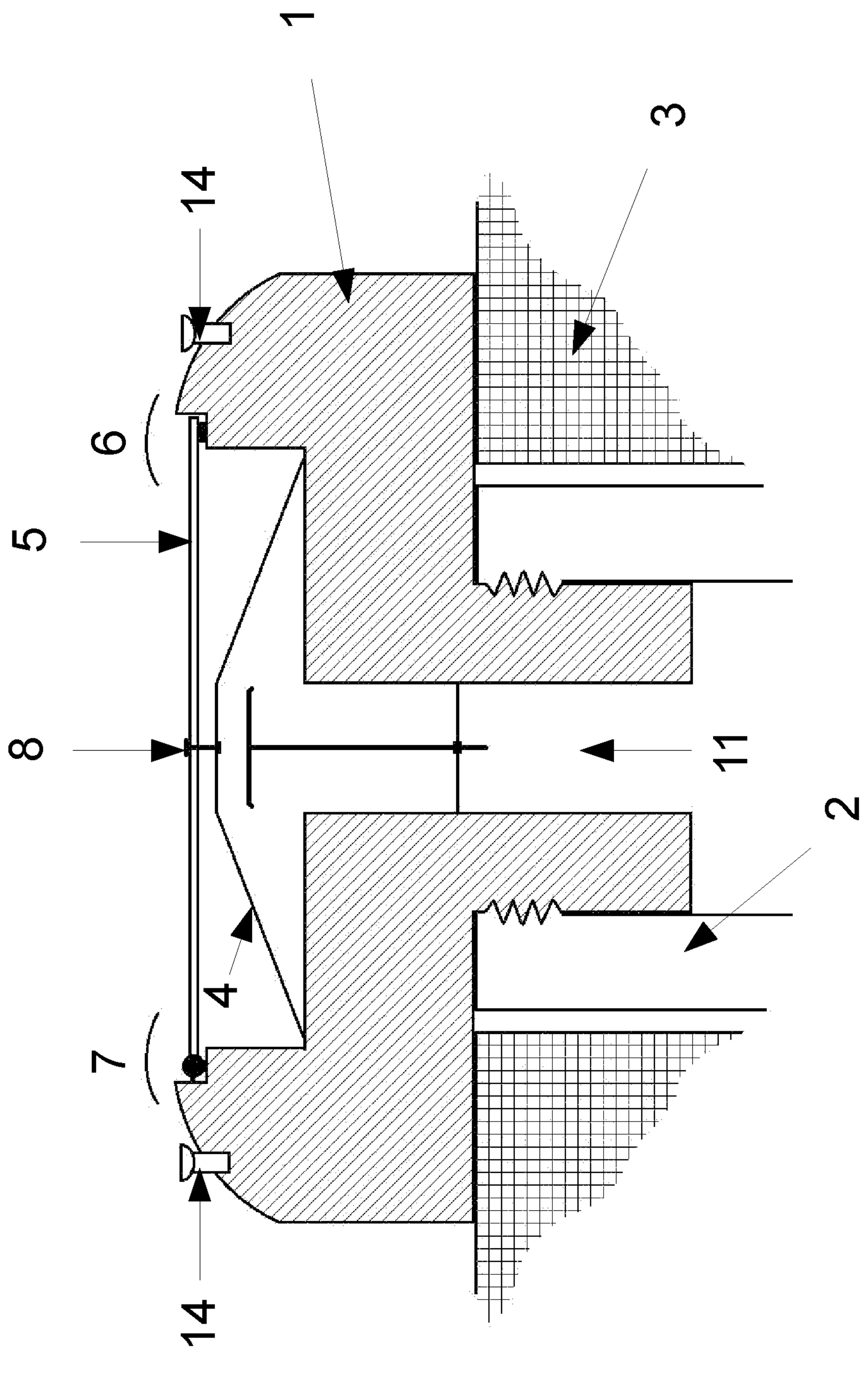
FIG. 1*c* Closure for sprinklers and nozzles pre-tensioning screw.

The presented closure for sprinklers and nozzles with heat activation is suitable for use with water mist nozzles and/or with sprinklers. The nozzle consists of a nozzle body 1 which can be connected to an extinguishing agent supply 2 of a fire protection system and arranged on a ceiling 3 or wall 3 of a building (FIGS. 1*a-c*). The nozzle body 1 has an outlet channel 11 through which the extinguishing agent flows out at pressure and speed during use. The diameter and profile of the outlet channel 11 is adapted to the pressure present in the fire protection system, to the speed desired for extinguishing and to the desired distribution of the extinguishing agent. Advantageously, the outlet channel 11 has a widened outlet opening (FIG. 1*a*) or is provided with a fixed or extendable deflector plate (FIG. 1*b*). In the waiting position, the outlet channel 11 is tightly closed by a seal 4 which is pressed against the outlet opening of the outlet channel 11 by means of a cover 5 and is held in this closed position. The seal 4 can be pre-tensioned with a pre-tensioning screw 8 or with another suitable mechanism. In the embodiment of FIG. 1*c*, the seal 4 is connected to the cover 5 via a pre-tensioning screw 8 in such a way that by turning the pre-tensioning screw 8, the cover 5 and the seal 4 are spread apart and the seal 4 is pressed against the outlet opening of the outlet channel 11 and pre-tensioned. The cover 5 is detachably connected to the nozzle body 1 and is detached from it in the event of a fire, after which the seal 4 is washed away due to the pressure of the extinguishing agent in the fire protection system and thus the nozzle is put into action.

The core of the invention is the method of fastening and the release mechanism of the cover 5, which is fastened to the nozzle body 1 in such a way that the heat-sensitive element does not have to carry the complete pressure forces of the compressed seal 4 and of the pressurised extinguishing agent of the extinguishing system in the waiting position, but only part of it. In this case, the heat-sensitive element can be put under less pressure or tension by means of an actuating element, e.g. a spring or a magnet, in order to release the closure. For closures with a fusible element, this reduces the gradual deformation and change in material structure of the fusible element due to creep. In general, it allows more freedom in positioning the heat-sensitive element in the closure, providing nozzles with a much more compact design. For example, in closures using frangible glass bulbs, the glass bulb can be oriented at a right angle to the axis of the exit channel 11 to provide a particularly compact nozzle.

According to the invention, it is envisaged to attach the cover 5 to the nozzle body 1 at least 2 points, for example diametrically opposite in the case of a round cover 5 (FIGS. 1*a-c*). At least one of the fastenings between the cover 5 and the nozzle body 1 is a releasable arrangement 6 and at least one other fastening between the cover 5 and the nozzle body 1 is a connection 7. The heat-sensitive element is integrated in the at least one releasable arrangement 6 in such a way that the releasable arrangement 6 is released when the heat-sensitive element is activated, while the at least one connection 7 is merely an additional fastening of the cover 5 to the nozzle body 1. The forces exerted on the cover 5 are thus distributed between the at least one releasable arrangement 6 and the at least one connection 7, so that each releasable arrangement 6 only has to absorb part of these forces. In the event of fire, the release can be triggered both passively, i.e. directly due to the heat of the fire, or actively by selective heating of the heat-sensitive element, the ejection of the cover 5 being carried out according to the following steps:

1. When the heat-sensitive element is activated, the at least one releasable arrangement 6 is detached, the cover 5 remaining connected to the nozzle body 1 only by the at least one connection 7;
2. Due to the pressurised extinguishing agent in the extinguishing system, the seal 4 is ejected from the outlet opening of the outlet channel 11 and the cover 5 is ejected from the nozzle body 1, thus bringing the nozzle into action;
3. As one side of the cover 5 is still retained by the connection 7, the cover 5 moves around the connection 7;
4. This movement causes the cover 5 to fall out of the connection 7 as it passes a certain angle, which can also be very small, so that the cover 5 is then completely detached from nozzle body 1; and
5. The seal 4 is pushed away by the jet of extinguishing agent together with the cover 5, so that the operation of the nozzle is not hindered and no "shadow" is caused in the spray pattern.

It is important that the releasable arrangements 6 and the connection 7 are arranged in such a way that the detachment of the releasable arrangement 6 allows the mentioned movement of the cover 5 away from the nozzle body, until the complete detachment of the same.

Possible embodiments of the releasable arrangement 6 and of the connection 7 are explained in more detail in the following part with reference to FIGS. 2*a-d* and 3*a-c*.

Figure 2A:
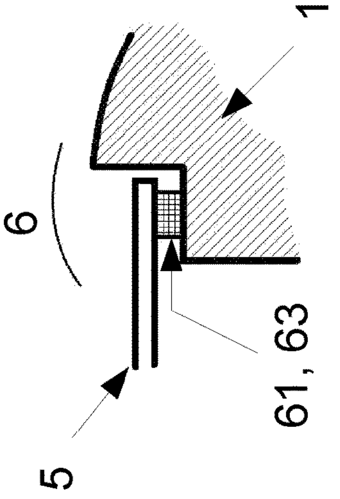
FIGS. 2*a-d* Detail of the releasable with arrangement.
Figure 2B:
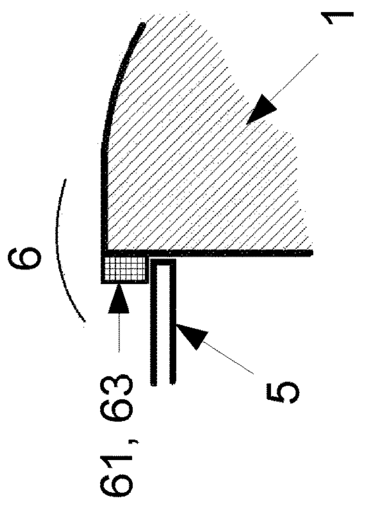

FIGS. 2*a-b* show possible embodiments of the releasable arrangement 6 comprising a fusible element 61 or an explosive 63. The fusible element 61 or explosive 63 establishes the connection between the cover 5 and the nozzle body 1. The fusible element 61 may be a metal alloy, a plastic or an adhesive. The chosen material must ensure the firm connection between the nozzle body 1 and the cover 5 only against a fraction of the forces of the seal 4 under tension and of the extinguishing agent under pressure. Furthermore, the material must melt within a relatively narrow temperature range that can be reliably defined over the years so that the fusible element melts completely within as short a time as possible when the lower limit of this temperature range is reached. In the event of fire, the fusible element 61 is passively heated by the heat generated by the fire until it melts and the cover 5 detaches. To actively trigger the closure, the invention provides for actively heating the fusible element 61 by means of a controlled electrical resistance induction or heating element. The resistive element may be the fusible element 61 itself if it is made of conductive material. In an alternative embodiment, the controlled electrical resistance or induction heating element is arranged adjacent to the fusible element 61 and the generated heat is transferred to the fusible element 61 by conduction or radiation.

Figure 2C:
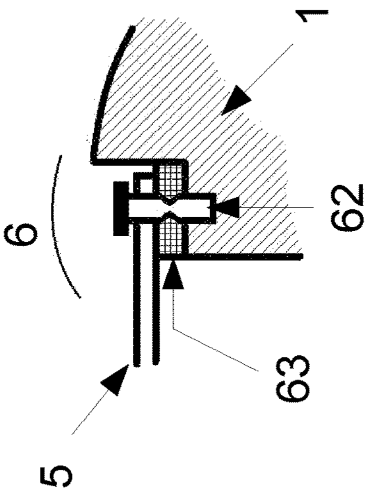

FIG. 2*c* shows another embodiment of the releasable arrangement 6 comprising a fastening element 62 and an explosive 63. The fastening element 62, for example a special screw or an adhesive, establishes the connection between the cover 5 and the nozzle body 1. When the explosive 63 is detonated, the cover 5 is detached from the nozzle body 1. This can be done, for example, by breaking off the fastening element 62, which may have a predefined breaking point, or by locally destroying the edge of the cover 5. In the event of fire, the explosive 63 is passively heated by the heat generated by the fire until it spontaneously detonates. To actively trigger the closure, the explosive 63 may be actively heated by means of a controlled electrical resistance or induction heating element. Alternatively, the electrical element could trigger the explosive 63 with an electrical pulse as in an airbag igniter or with a spark.

Figure 2D:
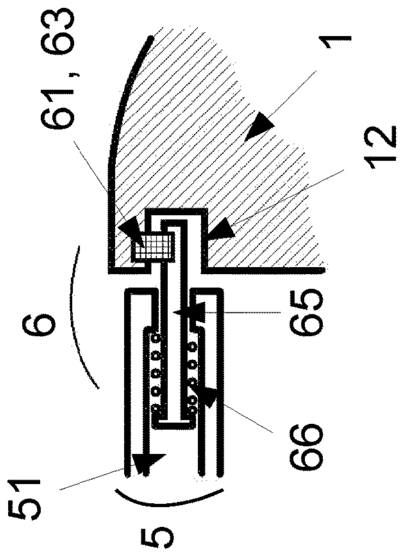

FIG. 2*d* shows a further embodiment of the releasable arrangement 6 comprising a latch 65 and a fusible element 61 or an explosive 63. The latch 65 is slidable in the cover 5 between two positions: a closed position in which the front end of the latch 65 abuts a first abutment of the nozzle body 1 or engages in a first recess 12 of the nozzle body 1, and an open position in which the front end of the latch 65 does not engage in the first recess 12. The cover 5 has an inner cavity 51 into which the rear part of the latch 65 engages. An actuating element 66 acts on the latch 65 and on the cover 5 in such a way that the latch 65 is always pressed in the direction of the open position. Depending on the embodiment of the closure, a spring or a magnet can be used as actuating element 66. In the embodiment of FIG. 2*d*, for example, a spring 66 is arranged between a bulge of the latch and a wall of the inner cavity 51. In the waiting position, the latch 65 is held in the closed position against the force of the actuating element 66 by means of a fusible element 61 or of an explosive 63.

Figure 3B:
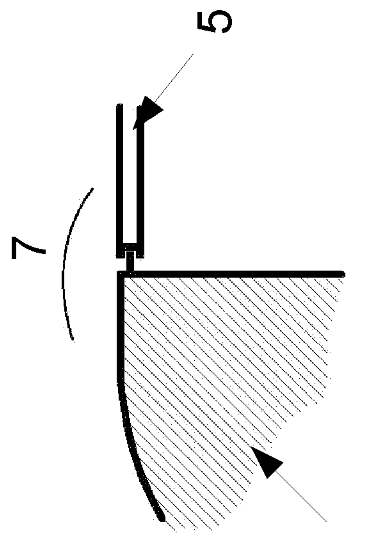
FIGS. 3*a-c* Detail of the connection.
Figure 3C:
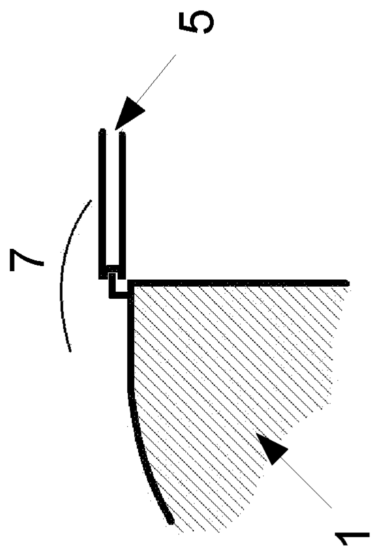
Figure 3A:
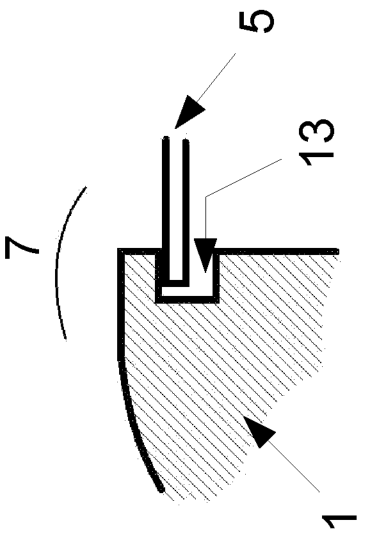

FIG. 3*a* shows a possible embodiment of the connection 7, whereby the edge of the cover 5 simply engages in a second recess 13 of the nozzle body 1. This simple method of attachment firmly retains the cover 5 but does not prevent its ejection once the releasable arrangement 6 is detached. To make it easier to attach the cover 5 to the nozzle body 1 at any angle, the second recess 13 may simply be a circumferential groove 13.

FIGS. 3*b-c* show further possible embodiments of the connection 7, wherein the nozzle body 1 has a hook which engages in a recess in the cover 5.

In an alternative embodiment of the closure, the releasable arrangement 6 comprises a latch 65 and a heat-sensitive element 52 which is arranged in the cover 5 behind the latch 65 and holds the latch 65 in the closed position. A fusible element 61 or an explosive 63 may be used as the heat sensitive element. If a frangible glass bulb 64 is used as the heat-sensitive element, this may be arranged in the horizontal direction, i.e. at a right angle to the axis of the outlet channel 11, in order to save space and provide as compact an arrangement as possible. The glass bulb 64 can be integrated in the nozzle body 1 or, as shown for example in FIG. 4, in the cover 5. This is particularly advantageous because the glass bulb 64 breaks when activated and the cover 5 is ejected anyway. In more complex arrangements, e.g. a sprinkler with a deflector plate, certain parts of the arrangement can also be extendable. It is advantageous for all arrangements if they are as compact and space-saving as possible.

Figure 4:
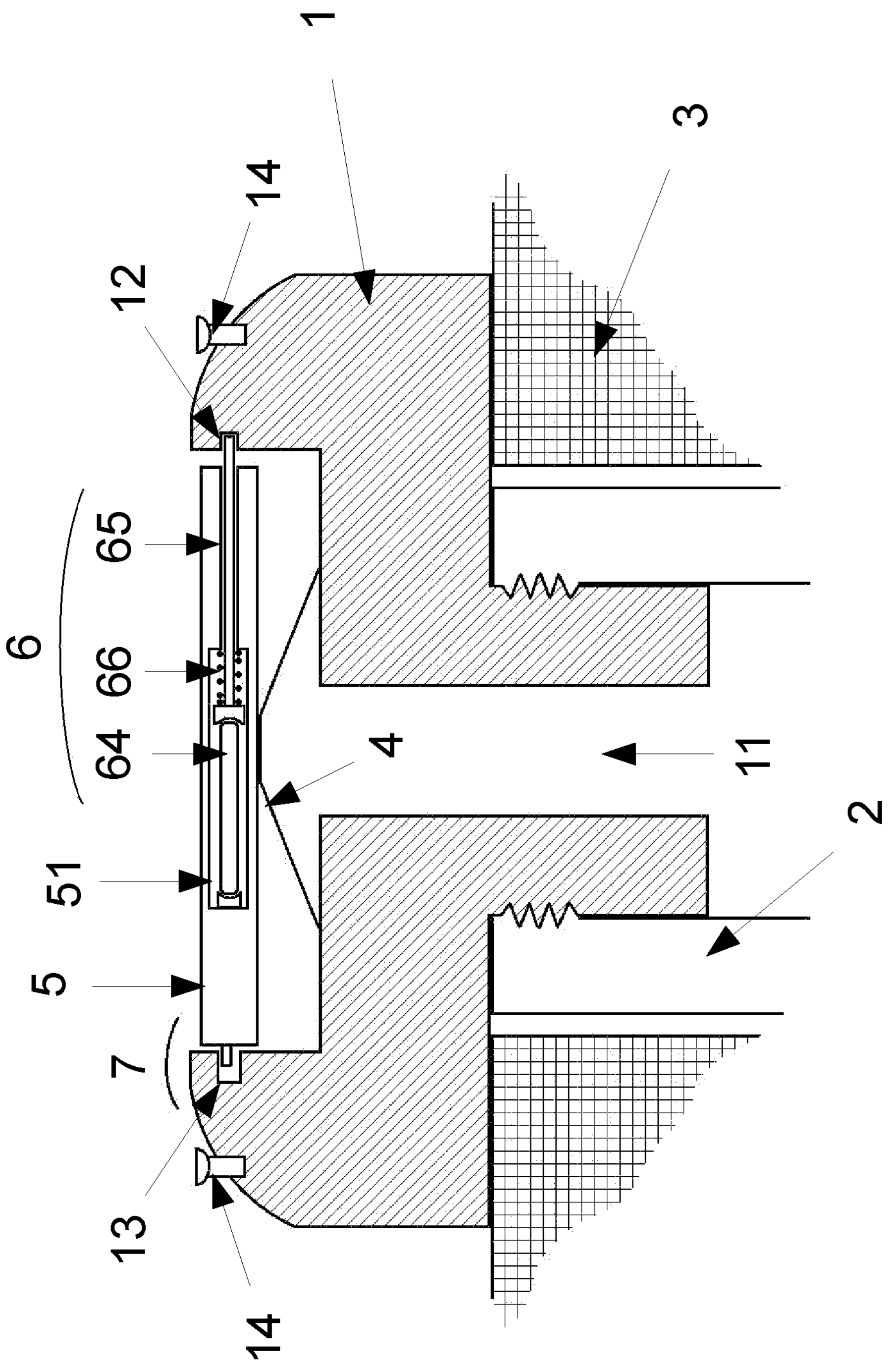
FIG. 4 Closure for sprinklers and nozzles with heat activation by a frangible glass bulb.
Figure 5:
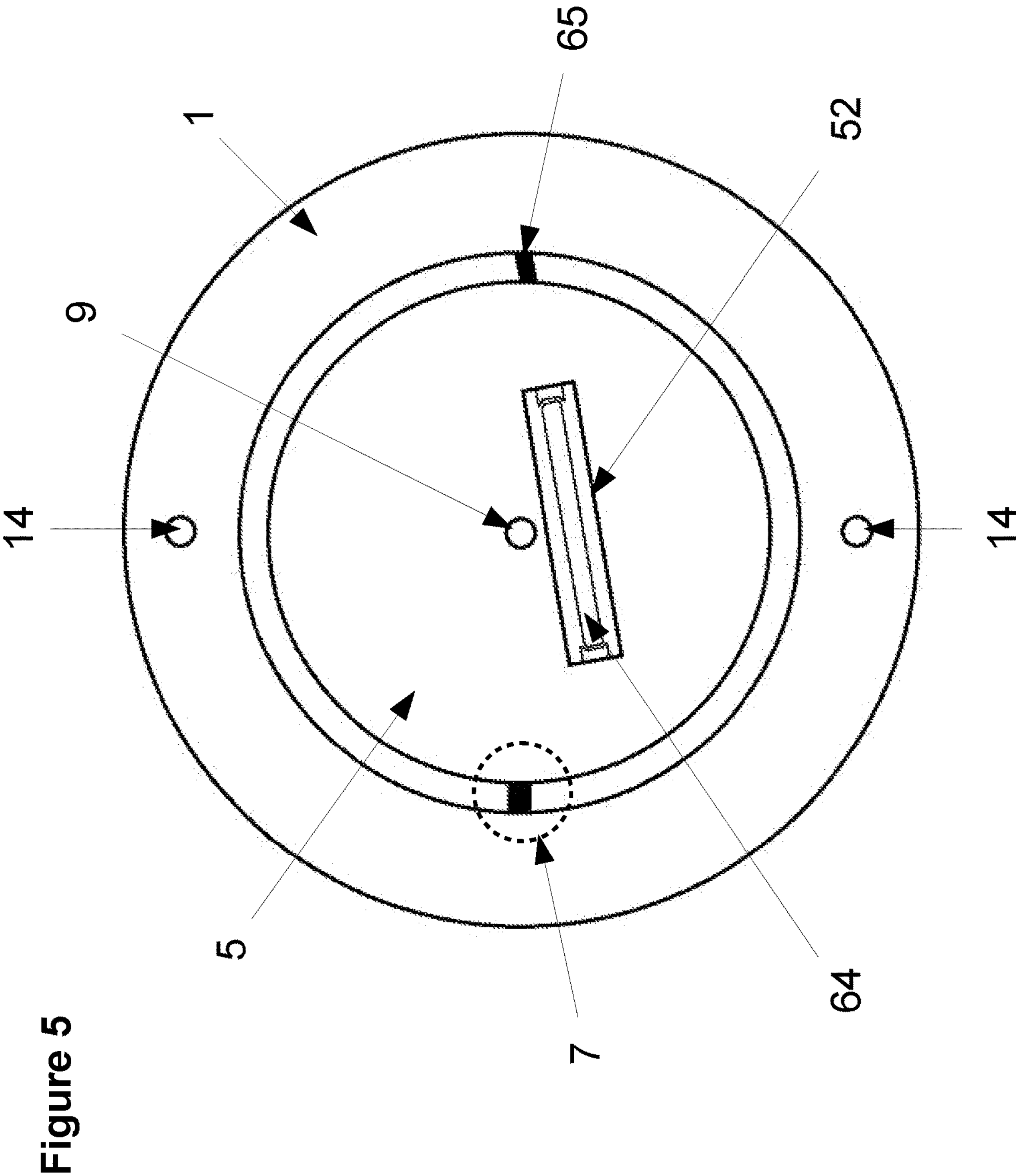
FIG. 5 Top view of nozzle with heat activation by a frangible glass bulb.
Figure 6A:
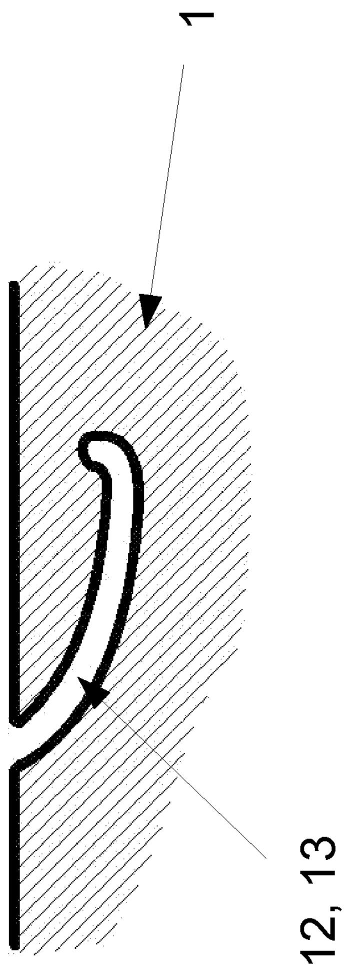
FIGS. 6*a-b* Bayonet groove.
Figure 6B:
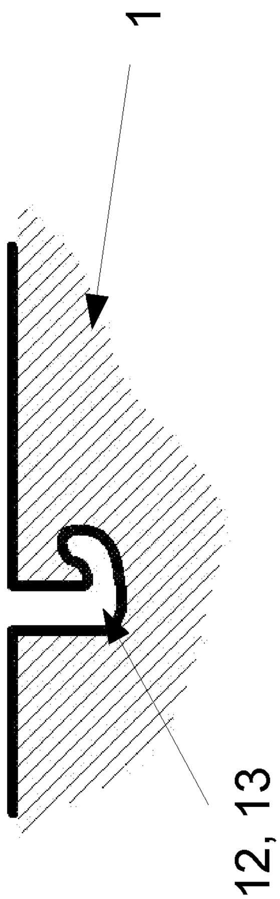

In the embodiment according to FIG. 4, the connection 7 simply consists of a second recess 13 in which an edge of the cover 5 engages. The releasable arrangement 6 comprises the glass bulb 64 and a latch 65 which engages in a first recess 12. To make the cover 5 easier to attach to the nozzle body 1 at any angle, the first recess 12 and the second recess 13 may simply form two separate circumferential grooves 12, 13, or even a common circumferential groove 12/13. For easy attachment of the cover 5 and simultaneous pressing of the seal 4 against the outlet channel 11, the first and second recesses 12, 13 could also form bayonet-shaped grooves (FIGS. 6*a-b*). The latch 65 is slidable in the cover 5 between two positions: a closed position in which the front end of the latch 65 engages in the first recess 12, and an open position in which the front end of the latch 65 does not engage in the first recess 12. The cover 5 has an inner cavity 51 into which the rear part of the latch 65 engages. An actuating element 66 acts on the latch 65 and on the cover 5 in such a way that the latch 65 is always pressed in the direction of the open position. Depending on the embodiment variant of the closure, a spring, a magnet or simply a weight can be used as the actuating element 66. In the embodiment variant of FIG. 4, for example, a spring 66 is arranged between a bulge of the latch and a wall of the inner cavity 51. In the waiting position, the latch 65 is held in the closed position against the force of the actuating element 66 by means of a heat-sensitive and frangible glass bulb 64. In the embodiment of FIG. 4, the glass bulb 64 is arranged between a wall of the inner cavity 51 and the rear end of the latch 65, thus preventing a movement of the latch 65 from the closed position to the open position.

Figure 7:
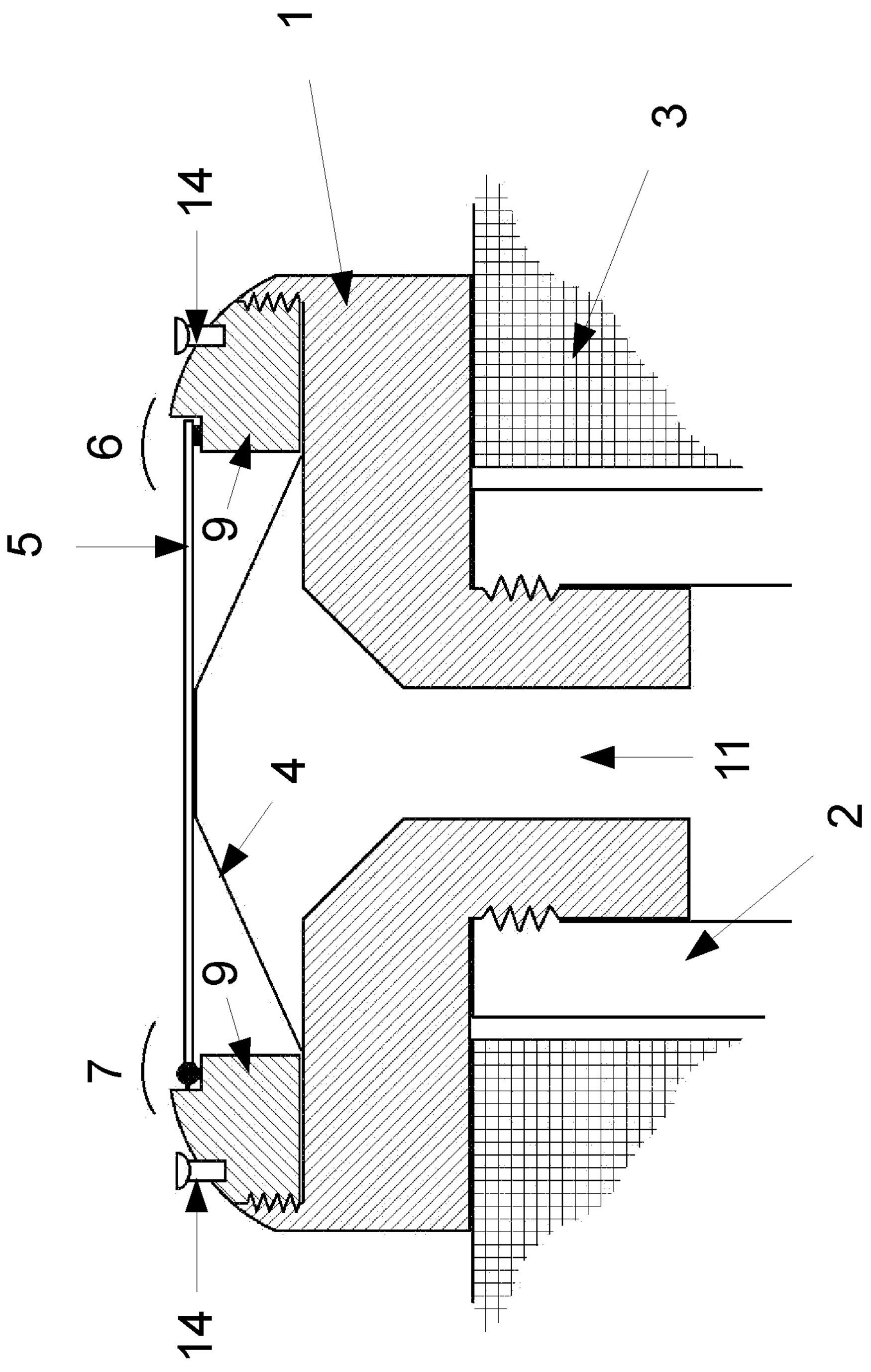
FIG. 7 Closure for sprinklers and nozzles with housing part.

Another possible embodiment provides that the cover 5 is pre-assembled and integrated in a housing part 9, whereby this housing part 9 is designed in such a way that it can be easily attached to the nozzle body 1. For example, it is possible to provide the housing part 9 with an external thread which can be screwed into the corresponding counter-thread of the nozzle body 1 (FIG. 7).

Preferably, a common heat-sensitive and frangible glass bulb for fire sprinklers available on the market can be chosen as the glass bulb 64. The glass bulb 64 ensures the passive activation of the closure: in the event of fire, the room air and the glass bulb 64 are heated until the glass bulb 64 bursts when a defined temperature is exceeded. For the active triggering of the closure, the glass bulb 64 is actively heated by means of a controlled electrical resistance or induction heating element. The electrical resistance or induction element may be a coil wound around the glass bulb 64, or a rectilinear path attached to its surface. In the preferred embodiment, the glass bulb is fully or partially coated with a resistive heating material. This ensures a larger contact area between the heating material and the glass bulb 64, thus promoting heat conduction from the heating element to the glass bulb. As soon as the glass bulb 64 no longer holds the latch 65 in the closed position, the actuating element 66 pulls it into the open position. From this moment on, the cover 5 is tilted away from the nozzle body 1 by the pressure of the extinguishing agent in the outlet channel 11.

The energy required to heat/trigger the fusible element 61, the explosive 63 and/or the glass bulb 64 originates either from an external energy source, e.g. via an electric line, or from a dedicated energy source, e.g. from an integrated battery. The heating of the heat sensitive element is controlled by an intelligent controller connected to one or more fire sensors 14, for example a smoke sensor or a thermostat. The intelligent controller is for example a microprocessor or a computer. In addition or instead, the intelligent controller may also receive an external fire alarm or instruction, for example from a central control station. The intelligent control offers the possibility that sensors first trigger an alarm and only after a defined time does the nozzle actually react with extinguishing agent. For example, a sensor triggers an alarm if toxic smoke endangers people without immediately putting the nozzle and the entire extinguishing system into operation and thus causing damage.

If some components (the energy source, the intelligent controller, the fire sensors 14 or the heat-sensitive element 52) are located in the cover 5 and others in the nozzle body 1, the nozzle must be provided with means for establishing electrical contact between the nozzle body 1 and the cover 5. In a possible embodiment of the invention, this electrical contact is established on the one hand by the releasable arrangement 6 and on the other hand by the connection 7. For this purpose, in the embodiment with glass bulb 64 in the cover 5, the second recess 13, the part of the edge of the cover 5 engaging therein, the first recess 12 and the latch 65 could comprise an electrically conductive material, consist of electrically conductive material or be coated with electrically conductive material.

The invention claimed is:

1. A closure for nozzles with heat activation, comprising:

a nozzle body (1); and an outlet channel (11), wherein a seal (4) is arranged on the nozzle body (1) above the outlet channel (11), which seals off the outlet channel (11), wherein the seal (4) is pressed against the outlet channel (11) by a cover (5) and is held in a closed position, blocking the outlet channel (11), wherein the cover (5) is detachably fastened to the nozzle body (1) and can be actively or passively removed in the event of fire, the cover (5) is arranged in the nozzle body (1) and connected to the nozzle body (1) by at least two fastenings, a first fastening of the at least two fastenings is a releasable arrangement (6) and a second fastening of the at least two fastenings is a connection (7) around which the cover (5) is movable, wherein the releasable arrangement (6) comprises a heat-sensitive element, which is frangible glass bulb (64), and is released upon active or passive activation of the heat-sensitive element, wherein the heat-sensitive element is arranged offset from a center of the cover (5), wherein the releasable arrangement (6) includes a latch (65) movable in the cover (5) between two positions: a closed position of the latch in which a front end of the latch (65) engages in a first recess (12) of the nozzle body (1) or abuts against a first abutment of the nozzle body (1), and an open position in which the front end of the latch (65) does not engage in the first recess (12) or does not abut against the first abutment, and wherein the cover (5) includes a spring, a magnet or a weight acting as an actuating element (66) which acts on the latch (65) and on the cover (5) in such a way that the latch (65) is always pushed or pulled towards the open position, wherein in a waiting position, the glass bulb (64) holds the latch (65) in the closed position against the force of the actuating element (66).

2. The closure according to claim 1, wherein:
said heat-sensitive element is arranged in the cover (5).

3. The closure according to claim 1, wherein:
the cover (5) falls out of the connection (7) after a certain angle of movement and is thus completely detached from the nozzle body (1).

4. The closure according to claim 1, wherein:
the glass bulb (64) is arranged in the cover (5) substantially at a right angle to an axis parallel to the flow direction of an extinguishing agent passing through the outlet channel (11).

5. The closure according to claim 1, wherein:
said heat-sensitive element is actively heated by a coil wound around the glass bulb (64), wherein the coil is a controlled electrical resistance or induction heating element used to activate the nozzle.

6. The closure according to claim 1, further comprising:
an intelligent controller used for active heating of said heat-sensitive element.

7. The closure according to claim 6, wherein:
the intelligent controller communicates with at least one fire sensor (14) or with an external control station from which the intelligent controller receives fire alarms or instructions.

8. A closure for nozzles with heat activation, comprising:
a nozzle body (1); and
an outlet channel (11), wherein a seal (4) is arranged on the nozzle body (1) above the outlet channel (11), which seals off the outlet channel (11), wherein the seal (4) is pressed against the outlet channel (11) by a cover (5) and is held in a closed position, blocking the outlet channel (11), wherein the cover (5) is detachably fastened to the nozzle body (1) and can be actively or passively removed in the event of fire, the cover (5) is arranged in the nozzle body (1) and connected to the nozzle body (1) by at least two fastenings, a first fastening of the at least two fastenings is a releasable arrangement (6) and a second fastening of the at least two fastenings is a connection (7) around which the cover (5) is movable, wherein the releasable arrangement (6) comprises a heat-sensitive element, which is frangible glass bulb (64), and is released upon active or passive activation of the heat-sensitive element, wherein the heat-sensitive element is arranged inside the nozzle body (1) and either located inside the cover (5) or on the inside of the cover (5), facing the outlet channel (11) and active heating of the heat-sensitive element is controlled by an intelligent controller, which communicates with one or more fire sensors (14), both the intelligent controller and the one or more fire sensors (14) are arranged in or on the nozzle body, wherein the releasable arrangement (6) includes a latch (65) movable in the cover (5) between two positions: a closed position of the latch in which a front end of the latch (65) engages in a first recess (12) of the nozzle body (1) or abuts against a first abutment of the nozzle body (1), and an open position in which the front end of the latch (65) does not engage in the first recess (12) or does not abut against the first abutment, and wherein the cover (5) includes a spring, a magnet or a weight acting as an actuating element (66) which acts on the latch (65) and on the cover (5) in such a way that the latch (65) is always pushed or pulled towards the open position, wherein in a waiting position, the glass bulb (64) holds the latch (65) in the closed position against the force of the actuating element (66).

9. The closure according to claim 8, characterized in that the cover (5) falls out of the connection (7) after a certain angle of movement and is thus completely detached from the nozzle body (1).

* * * * *